United States Patent
Kubo

(10) Patent No.: US 6,671,430 B2
(45) Date of Patent: Dec. 30, 2003

(54) OPTICAL DEVICE, TERMINAL APPARATUS, AND SYSTEM FOR WAVELENGTH DIVISION MULTIPLEXING

(75) Inventor: Teruhiro Kubo, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 67 days.

(21) Appl. No.: 09/975,023

(22) Filed: Oct. 12, 2001

(65) Prior Publication Data

US 2002/0027683 A1 Mar. 7, 2002

Related U.S. Application Data

(63) Continuation of application No. PCT/JP99/02500, filed on May 14, 1999.

(51) Int. Cl.[7] .................................................. G02B 6/28
(52) U.S. Cl. ........................................... 385/24; 398/82
(58) Field of Search ...................... 385/24, 50; 398/82

(56) References Cited

U.S. PATENT DOCUMENTS 5,859,717 A * 1/1999 Scobey et al. ............. 359/124
6,118,912 A * 9/2000 Xu ............................. 385/24

FOREIGN PATENT DOCUMENTS

| JP | 64023221 A | 1/1989 |
| JP | 07075145 A | 3/1995 |
| JP | 07333462 A | 12/1995 |
| JP | 08195734 A | 7/1996 |
| JP | 09233053 A | 9/1997 |
| JP | 09261205 A | 10/1997 |
| JP | 10145298 A | 5/1998 |
| JP | 10221561 A | 8/1999 |

* cited by examiner

*Primary Examiner*—Frank G. Font
*Assistant Examiner*—Michael P. Mooney
(74) *Attorney, Agent, or Firm*—Staas & Halsey LLP

(57) ABSTRACT

There are provided an optical device, a terminal station apparatus and a system for wavelength division multiplex. An optical device comprises a WDM port, a specific port to which is allocated an intermediate wavelength between a long-wavelength group and a short-wavelength group, a plurality of ports to which are allocated those wavelength groups described above, and first to fourth optical filters.

8 Claims, 9 Drawing Sheets

OPTICAL DEVICE, TERMINAL APPARATUS, AND SYSTEM FOR WAVELENGTH DIVISION MULTIPLEXING

This application is a continuation of PCT/JP99/02500 filed May 14, 1999.

BACKGROUND OF THE INVENTION

1. Field of the Invention

The present invention relates generally to an optical device, terminal apparatus, and system for wavelength division multiplexing suitable for an increase in transmission capacity, and more particularly to an improvement in an optical device usable as an optical multiplexer and/or an optical demultiplexer.

2. Description of the Related Art

In recent years, the processing of enormous amounts of information has been needed with the evolution of an advanced information society, and optical fiber communication fit for a large capacity has been applied to a transmission network for transmitting information. While a transmission rate of information in optical fiber communication has already reached 2.4 Gb/s or 10 Gb/s, a further increase in transmission capacity will be needed in a motion picture captured communication system that is expected to be put to practical use in the future. For example, a transmission capacity of more than 1 terabit per second (Tb/s) will be needed in a trunk system.

Research and development on wavelength division multiplexing (WDM) is being actively carried out to increase a transmission capacity in optical fiber communication. In a system adopting WDM, a plurality of optical carriers having different wavelengths are used. The optical carriers are individually modulated to obtain a plurality of optical signals. The optical signals are next wavelength division multiplexed by an optical multiplexer to obtain WDM signal light. The WDM signal light is next launched into an optical fiber transmission line. At a receiving end, the WDM signal light received is separated into a plurality of individual optical signals by an optical demultiplexer to reproduce transmitted data according to each optical signal. Accordingly, by applying WDM to such a system, a transmission capacity in a single optical fiber can be increased according to the number of WDM channels.

As an optical device usable as the optical multiplexer and/or the optical demultiplexer, an arrayed waveguide grating (AWG) is known in the art. For example, the AWG includes a first slab waveguide to which a plurality of input optical waveguides are connected, a second slab waveguide to which a plurality of output optical waveguides are connected, and a plurality of connecting optical waveguides provided between the first and second slab waveguides and having different optical path lengths. The connecting optical waveguides and the first and second slab waveguides operate as a diffraction grating, so that each input optical waveguide and each output optical waveguide are coupled by a specific wavelength. Accordingly, by connecting the input optical waveguides to a plurality of optical transmitters, respectively, and connecting one of the output optical waveguides to a single optical fiber transmission line, this AWG functions as an optical multiplexer at a transmitting end. Further, by connecting one of the input optical waveguides to a single optical fiber transmission line and connecting a plurality of optical receivers to the output optical waveguides, respectively, this AWG functions as an optical demultiplexer at a receiving end.

Thus, an AWG may be provided by optical waveguides, thereby allowing size reduction of an optical multiplexer and an optical demultiplexer. However, the insertion loss by an AWG is generally large, so that in a system having an AWG as an optical multiplexer and/or an optical demultiplexer, there is a possibility of degradation in transmission quality. Further, in the case that the AWG is provided by optical waveguides, a highly skilled technique is required to connect the AWG to an optical fiber transmission line, so that it is not easy to manufacture an optical device usable as an optical multiplexer and/or an optical demultiplexer.

As a conventional more typical optical device usable as an optical multiplexer and/or an optical demultiplexer, there is an optical device including a plurality of optical filters each having a dielectric multilayer film or the like. For example, the optical device is configured by cascading a plurality of bandpass filters, so as to perform demultiplexing of WDM signal light. Each bandpass filter has a passband including a corresponding wavelength and excluding the other wavelengths. In this optical device, the insertion loss by each bandpass filter is accumulated from the upstream side toward the downstream side, so that there is a problem of variation in the insertion loss between the wavelengths.

To cope with this problem, it may be proposed to apply an optical filter having an input port and first and second output ports and functioning as a WDM coupler. This optical filter couples the input port to the first output port for a group of wavelengths longer than the cutoff wavelength of this filter, and couples the input port to the second output port for a group of wavelengths shorter than the cutoff wavelength. In other words, this optical filter is a long-wave pass filter or a short-wave pass filter. By applying the above-mentioned optical device having a plurality of bandpass filters to each of the group of longer wavelengths and the group of shorter wavelengths, the variation in insertion loss can be half reduced. However, in the case that the wavelength spacing is narrow as in dense WDM, a loss tilt (a tilt in wavelength characteristic of loss or a wavelength derivative of loss) near the cutoff wavelength must be set sufficiently large. As a result, the design of optical parameters of a dielectric multilayer film becomes complicated, for example, causing a problem that the manufacture of the optical device is difficult.

SUMMARY OF THE INVENTION

It is therefore an object of the present invention to provide an optical device usable as an optical multiplexer and/or an optical demultiplexer which can be easily manufactured and can reduce a maximum variation in insertion loss between wavelengths.

It is another object of the present invention to provide a terminal apparatus and a system each including such an optical device.

Other objects of the present invention will become apparent from the following description.

In accordance with an aspect of the present invention, there is provided an optical device comprising a WDM port adapted to wavelength division multiplexing (WDM); first to N-th ports to which first to N-th wavelengths are respectively allocated, where N is an integer greater than 4; and first to fourth optical filters. The first optical filter couples said WDM port to said i-th port by said i-th wavelength, where i is an integer satisfying $3 \leq i \leq (N-2)$, and also couples said WDM port to said second optical filter by the plural wavelengths except said i-th wavelength. The second optical filter couples said first optical filter to said third optical filter by said first to (i−1)-th wavelengths, and also couples said first optical filter to said fourth optical filter by said (i+1)-th to N-th wavelengths. The third optical filter couples said second optical filter to said first to (i−1)-th ports respectively by said first to (i−1)-th wavelengths. The fourth optical filter couples said second optical filter to said (i+1)-th to N-th ports respectively by said (i+1)-th to N-th wavelengths. The i-th wavelength may comprise a plurality of wavelengths.

In this optical device, the first optical filter separates WDM signal light into an optical signal having the i-th wavelength and optical signals having the other wavelengths. Accordingly, a long-wave pass filter or short-wave pass filter having a large loss tilt near the cutoff wavelength, for example, can be used as the second optical filter, so that this optical device can be easily manufactured. In this case, the cutoff wavelength is set substantially equal to the i-th wavelength (in the case that the i-th wavelength comprises a plurality of wavelengths, the cutoff wavelength is set substantially equal to a central one of these plural wavelengths). Furthermore, the second optical filter separates the remaining wavelengths into a group of wavelengths longer than the cutoff wavelength and a group of wavelengths shorter than the cutoff wavelength. Accordingly, a maximum variation in insertion loss between the wavelengths can be reduced.

In accordance with another aspect of the present invention, there is provided a system comprising first and second terminal apparatuses, and an optical fiber transmission line connecting said first and second terminal apparatuses. The first terminal apparatus comprises a plurality of optical transmitters for outputting a plurality of optical signals having different wavelengths, and an optical multiplexer for wavelength division multiplexing said plurality of optical signals and outputting resultant WDM signal light to said optical fiber transmission line. The second terminal apparatus comprises an optical demultiplexer for separating WDM signal light transmitted by said optical fiber transmission line into a plurality of optical signals having different wavelengths, and a plurality of optical receivers for receiving said plurality of optical signals output from said optical demultiplexer. At least one of said optical multiplexer and said optical demultiplexer comprises an optical device according to the present invention.

In accordance with a further aspect of the present invention, there is provided a terminal apparatus comprising a plurality of optical transmitters for outputting a plurality of optical signals having different wavelengths, and an optical multiplexer for wavelength division multiplexing said plurality of optical signals. The optical multiplexer comprises an optical device according to the present invention.

In accordance with a still further aspect of the present invention, there is provided a terminal apparatus comprising an optical demultiplexer for separating wavelength division multiplexed signal light into a plurality of optical signals having different wavelengths, and a plurality of optical receivers for receiving said plurality of optical signals. The optical demultiplexer comprises an optical device according to the present invention.

In the system or the terminal apparatus according to the present invention, an optical device whose maximum variation in insertion loss between the wavelengths is small is used as the optical multiplexer and/or the optical demultiplexer, so that a transmission quality can be improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1A:
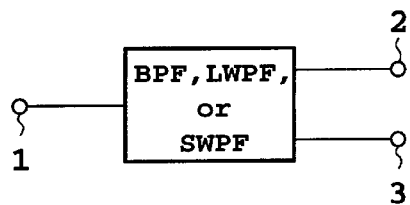
FIG. 1A is a block diagram for illustrating the function of an optical filter applicable to the present invention.

Referring to FIG. 1A, there is shown an optical filter adapted to wavelength division multiplexing (WDM). This optical filter has ports 1, 2, and 3. For example, in the case that this optical filter is a bandpass filter (BPF), the port 1 and the port 2 are coupled by a specific wavelength, and the port 1 and the port 3 are coupled by the other plural wavelengths. That is, between the port 1 and the port 2, the loss for the specific wavelength is sufficiently small (e.g., 1 dB or less) and the loss for the other plural wavelengths is sufficiently large (e.g., tens of dB or more), whereas between the port 1 and the port 3, the loss for the specific wavelength is sufficiently large (e.g., tens of dB or more) and the loss for the other plural wavelengths is sufficiently small (e.g., 1 dB or less). Accordingly, in the case that WDM signal light obtained by wavelength division multiplexing a plurality of optical signals having different wavelengths is input to the port 1, the optical signal having the specific wavelength is output from the port 2, and the other optical signals are output from the port 3. Reversibly, in the case that the optical signal having the specific wavelength is supplied to the port 2 and the other optical signals are supplied to the port 3, these optical signals supplied to the ports 2 and 3 are wavelength division multiplexed and resultant WDM signal light is output from the port 1.

In the case that the optical filter shown in FIG. 1A is a long-wave pass filter (LWPF) or a short-wave pass filter (SWPF), the port 1 and the port 2 are coupled by a group of wavelengths longer than the cutoff wavelength of the optical filter, and the port 1 and the port 3 are coupled by a group of wavelengths shorter than the cutoff wavelength. That is, between the port 1 and the port 2, the loss for the longer wavelengths is sufficiently small (e.g., 1 dB or less) and the loss for the shorter wavelengths is sufficiently large (e.g., tens of dB or more), whereas between the port 1 and the port 3, the loss for the longer wavelengths is sufficiently large (e.g., tens of dB or more) and the loss for the shorter wavelengths is sufficiently small (e.g., 1 dB or less). Accordingly, in the case that WDM signal light is input to the port 1, the optical signals having the longer wavelengths are output from the port 2, and the optical signals having the shorter wavelengths are output from the port 3. Reversibly, in the case that the optical signals having the longer wavelengths are input to the port 2 and the optical signals having the shorter wavelengths are input to the port 3, these optical signals input to the ports 2 and 3 are wavelength division multiplexed and resultant WDM signal light is output from the port 1. Thus, the optical filter is an LWPF in the case that attention is paid to between the port 1 and the port 2, while being an SWPF in the case that attention is paid to between the port 1 and the port 3.

Figure 1B:
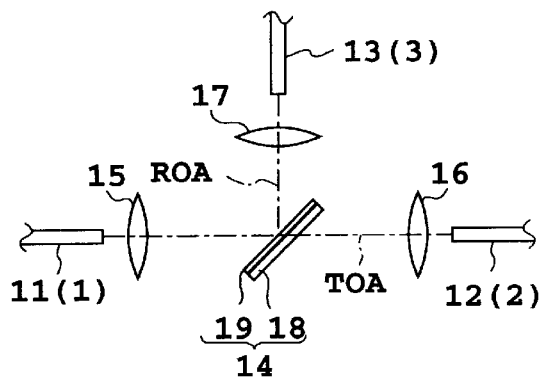
FIG. 1B is a diagram showing an example of the configuration of the optical filter shown in FIG. 1A.

FIG. 1B shows an example of the configuration of the optical filter shown in FIG. 1A. Optical fibers 11, 12, and 13 respectively corresponding to the ports 1, 2, and 3 are provided. To couple the optical fibers 11 and 12 by a transmissive optical path TOA related to a filter member 14, lenses 15 and 16 are provided so as to be opposed to the fiber ends of the optical fibers 11 and 12, respectively. Further, to couple the optical fibers 11 and 13 by a reflective optical path ROA related to the filter member 14, a lens 17 is provided so as to be opposed to the fiber end of the optical fiber 13. The filter member 14 is composed of a transparent substrate 18 of glass or the like and a filter film 19 of a dielectric multilayer film or the like formed on the substrate 18. The allocation of the ports 2 and 3 may be reversed.

Figure 1C:
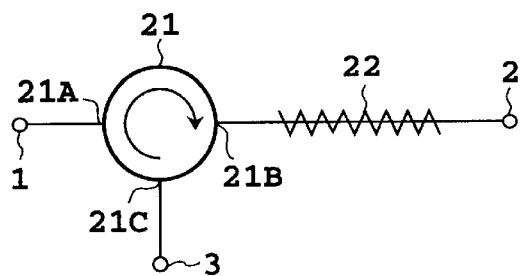
FIG. 1C is a diagram showing another example of the configuration of the optical filter shown in FIG. 1A.

FIG. 1C shows another example of the configuration of the optical filter shown in FIG. 1A. In this example, an optical circulator 21 and a fiber grating 22 are used. The optical circulator 21 has ports 21A, 21B, and 21C, and functions in such a manner that light supplied to the port 21A is output from the port 21B, light supplied to the port 21B is output from the port 21C, and light supplied to the port 21C is output from the port 21A. The port 21A is connected to the port 1, the port 21B is connected to a first end of the fiber grating 22, and the port 21C is connected to the port 3. A second end of the fiber grating 22 is connected to the port 2. The allocation of the ports 2 and 3 may be reversed.

In the case that the refractive index of an optical medium (e.g., glass) is permanently changed by light irradiation, this medium is referred to as a photosensitive material. By using this property, a fiber grating can be fabricated in the core of an optical fiber. The feature of a fiber grating is to Bragg reflect light in a narrow band near a resonant wavelength, for example, determined by the grating pitch and the effective refractive index of a fiber mode. A fiber grating may be fabricated by irradiating an optical fiber with excimer laser oscillating at a wavelength of 248 nm or 193 nm by the use of a phase mask.

Figure 2:
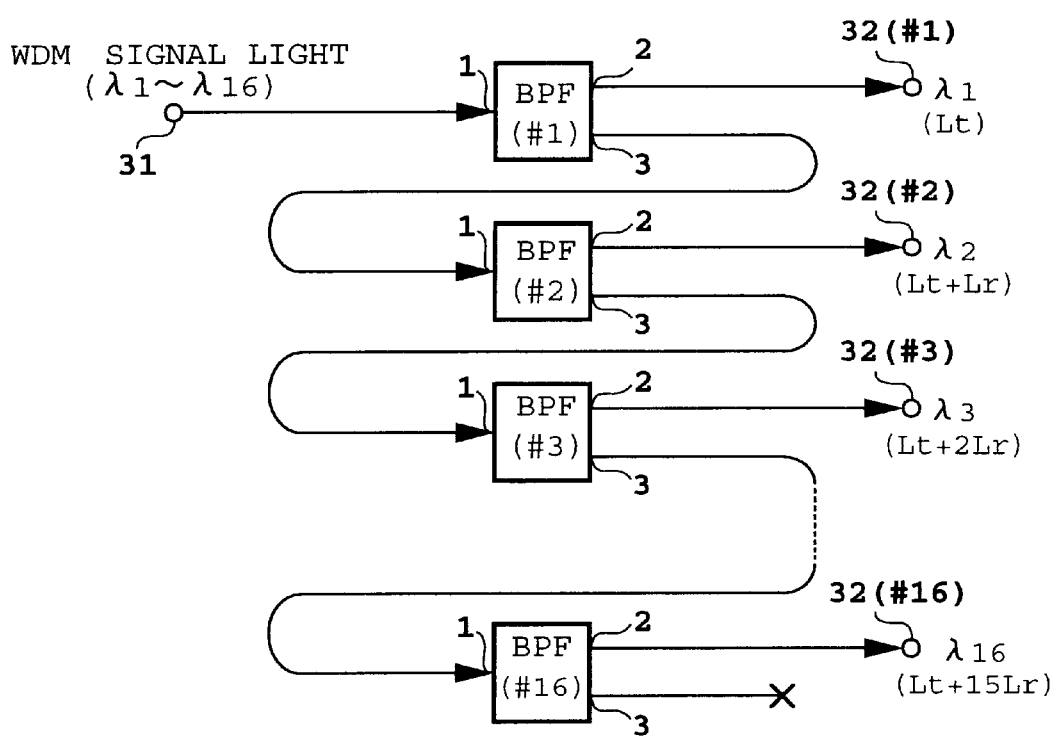
FIG. 2 is a block diagram of a conventional optical device usable as each of an optical multiplexer and an optical demultiplexer.

FIG. 2 is a block diagram of a conventional optical device usable as each of an optical multiplexer and an optical demultiplexer. This optical device has a WDM port 31 adapted to WDM and a plurality of ports 32(#1) to 32(#N). Different wavelengths $\lambda 1$ to $\lambda N$ are allocated to the ports 32(#1) to 32(#N), respectively. In the case shown in FIG. 2, N=16. In this case, the optical device is used as an optical demultiplexer, and the direction of propagation of WDM signal light or optical signals is shown by arrows (the same applies to FIGS. 3, 5, and 7).

A plurality of bandpass filters BPF(#1) to BPF(#N) are cascaded to couple the WDM port 31 to the ports 32(#1) to 32(#N). Each of the bandpass filters BPF(#1) to BPF(#N) has ports 1, 2, and 3 as shown in FIG. 1A. The WDM port 31 is connected to the port 1 of the first bandpass filter BPF(#1). The port 2 of the i-th bandpass filter BPF(#i) is connected to the i-th port 32(#i). The port 3 of the i-th bandpass filter BPF(#i) is connected to the port 1 of the (i+1)-th bandpass filter BPF(#(i+1)).

Letting Lt denote the loss for the wavelength coupling the port 1 and the port 2 in each of the bandpass filters BPF(#1) to BPF(#N) and Lr denote the loss for the wavelengths coupling the port 1 and the port 3 in each bandpass filter, the loss between the WDM port 31 and the port 32(#1) is basically Lt, the loss between the WDM port 31 and the port 32(#2) is basically Lt+Lr, . . . , and the loss between the WDM port 31 and the port 32(#16) is basically Lt+15 Lr. Accordingly, a maximum variation in insertion loss between the wavelengths in this optical device is 15 Lr.

Thus, the optical device shown in FIG. 2 has a problem that the maximum variation in insertion loss between the wavelengths is large. For example, in the case that this optical device is configured as shown in FIG. 1B, the loss Lt is estimated at 1 dB and the loss Lr is estimated at 0.4 dB. Accordingly, in the case that this optical device is configured for 16-channel WDM, the maximum variation in insertion loss becomes about 6 dB.

Figure 3:
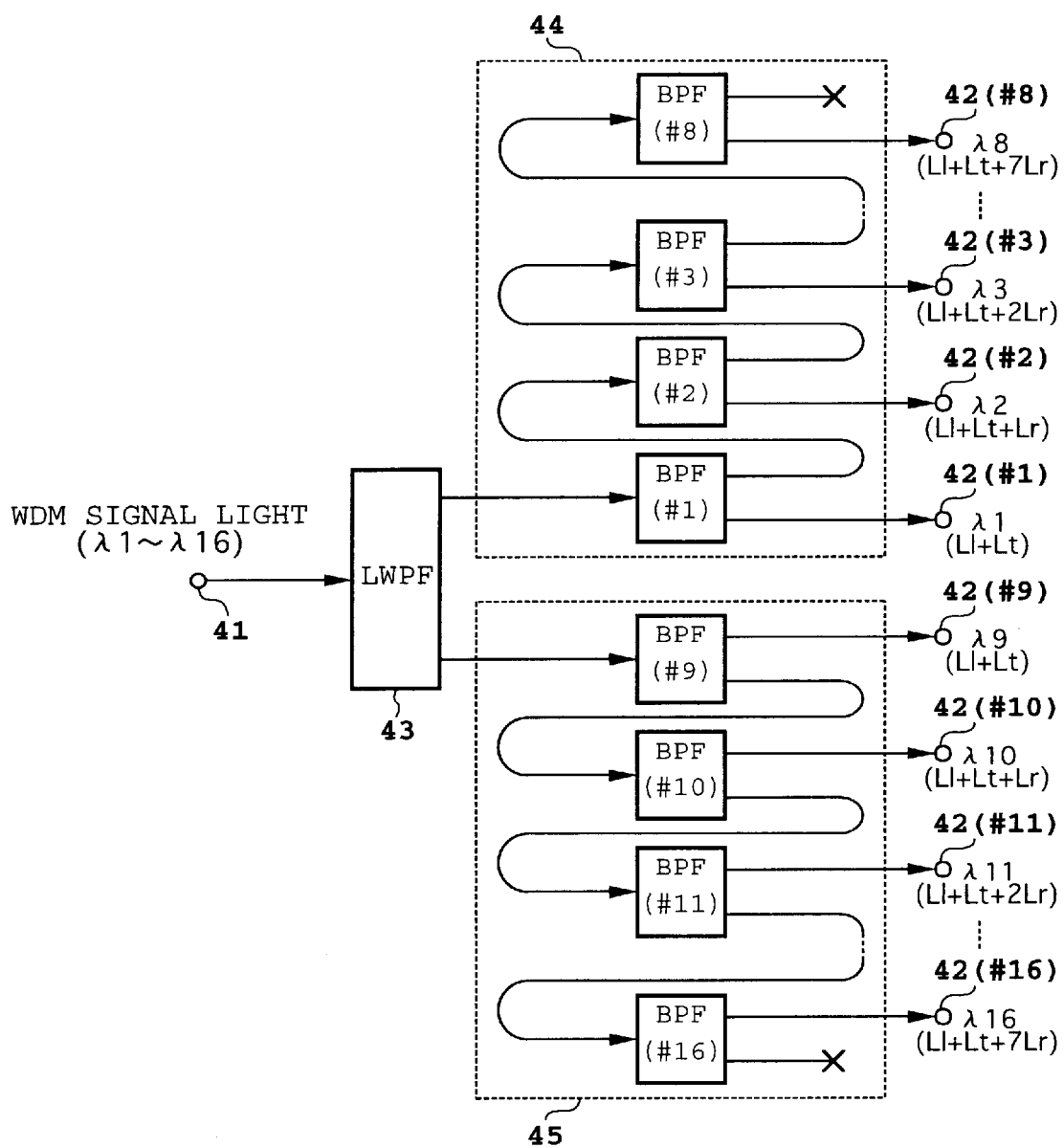
FIG. 3 is a block diagram of an improved optical device that may be proposed on the basis of the optical device shown in FIG. 2.

FIG. 3 is a block diagram of an improved optical device that may be proposed on the basis of the optical device shown in FIG. 2. This optical device has a WDM port 41 adapted to WDM and a plurality of ports 42(#1) to 42(#N) to which different wavelengths $\lambda 1$ to $\lambda N$ are respectively allocated. In the case shown in FIG. 3, N=16.

Optical filters 43, 44, and 45 are provided to couple the WDM port 41 to the ports 42(#1) to 42(#16). The optical filter 43 is provided by a long-wave pass filter (LWPF), and each of the optical filters 44 and 45 is provided by the prior art shown in FIG. 2.

Assuming that the wavelengths $\lambda 1$ to $\lambda 16$ are in ascending order and that the LWPF as the optical filter 43 has a cutoff wavelength falling between the wavelengths $\lambda 8$ and $\lambda 9$, the functions of the optical filters 43, 44, and 45 will now be described. The optical filter 43 couples the WDM port 41 to the optical filter 44 by the wavelengths $\lambda 1$ to $\lambda 8$, and couples the WDM port 41 to the optical filter 45 by the wavelengths $\lambda 9$ to $\lambda 16$. The optical filter 44 couples the optical filter 43 to the ports 42(#1) to 42(#8) respectively by the wavelengths $\lambda 1$ to $\lambda 8$. The optical filter 45 couples the optical filter 43 to the ports 42(#9) to 42(#16) respectively by the wavelengths $\lambda 9$ to $\lambda 16$.

Letting L1 denote the insertion loss of the optical filter 43, a minimum value of the insertion loss of this optical device is given by the loss between the WDM port 41 and each of the ports 42(#1) and 42(#9), and this minimum value is L1+Lt whereas a maximum value of the insertion loss of the optical device is given by the loss between the WDM port 41 and each of the ports 42(#8) and 42(#16), and this maximum value is L1+Lt+7 Lr. Accordingly, a maximum variation in insertion loss between the wavelengths in this optical device is 7 Lr, so that this optical device is improved over the optical device shown in FIG. 2. The insertion loss L1 is 0.8 dB, for example.

Figure 4:
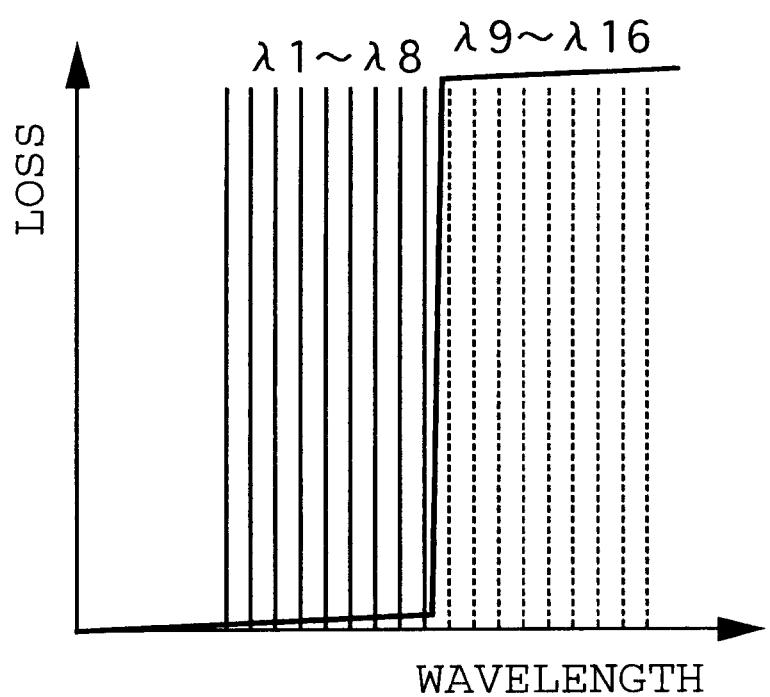
FIG. 4 is a graph showing a characteristic of a long-wave pass filter (LWPF) shown in FIG. 3.

FIG. 4 shows a characteristic of the LWPF as the optical filter 43 shown in FIG. 3. In FIG. 4, there is shown a wavelength characteristic of loss when the optical filter 43 couples the WDM port 41 to the optical filter 44. To make the loss for the shorter wavelengths (λ1 to λ8) sufficiently small and make the loss for the longer wavelengths (λ9 to λ16) sufficiently large, the cutoff wavelength must be set to a substantially central wavelength between the wavelengths λ8 and λ9, and the loss tilt near the cutoff wavelength must be made sufficiently large. For example, in the ITU grid for WDM defined by ITU, the spacing between adjacent wavelengths is 100 GHz on a frequency basis, and this value corresponds to about 0.8 nm near a wavelength of 1550 nm. Accordingly, in the case that such a narrow wavelength spacing is scheduled, the manufacture of an LWPF having such a characteristic as shown in FIG. 4 is accompanied by difficulty. More specifically, in the case that an LWPF is provided by the configuration shown in FIG. 1B, the filter film 19 must be manufactured by forming a dielectric multilayer film having 4 cavities and about 200 layers, for example. Further, since the characteristic of the LWPF is largely dependent on the thickness of the filter film 19 and the incident angle to the filter member 14, a highly skilled technique is required for the design of optical parameters (refractive index, film thickness, etc.) of the filter film 19 and for the alignment of the optical axis of the filter film 19.

Thus, in the optical device shown in FIG. 3, the LWPF as the optical filter 43 is required to have a severe characteristic, so that the manufacture of this optical device is not easy.

Figure 5:
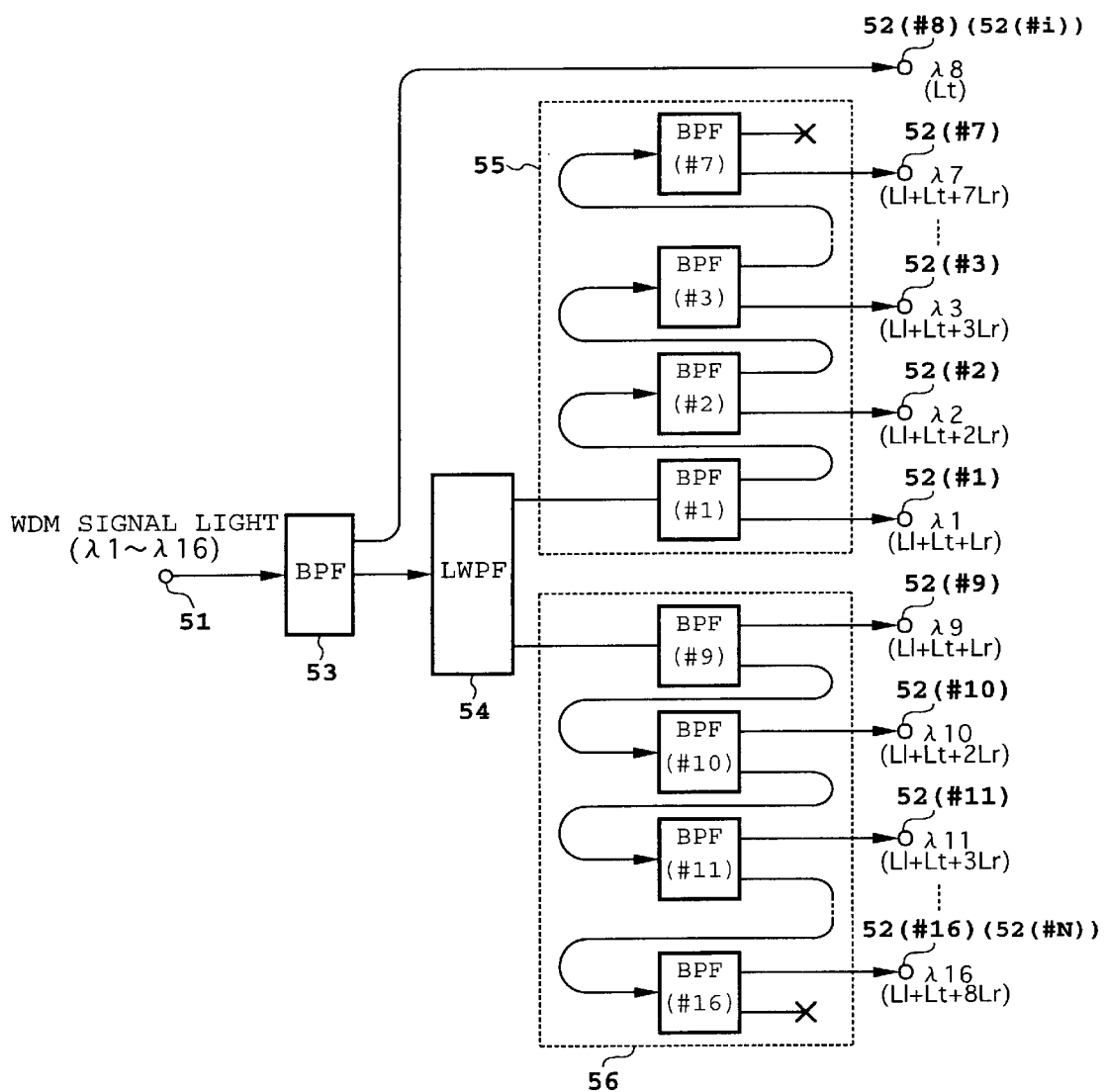
FIG. 5 is a block diagram showing a first preferred embodiment of the optical device according to the present invention.

FIG. 5 is a block diagram showing a first preferred embodiment of the optical device according to the present invention. This optical device has a WDM port 51 adapted to WDM and a plurality of ports 52(#1) to 52(#N) to which different wavelengths λ1 to λN are respectively allocated, where N is an integer greater than 4. In the preferred embodiment shown in FIG. 5, N=16 as an example. Further, while the wavelengths λ1 to λN are in ascending order for convenience of illustration, the present invention is not limited by this arrangement.

Optical filters 53, 54, 55, and 56 are provided to couple the WDM port 51 to the ports 52(#1) to 52(#N). The port 52(#i) to which the i-th wavelength λi (i is an integer satisfying 3≦i≦(N−2)) is allocated is a special port. Assuming that N=16 and i=8, the functions of the optical filters 53 to 56 will now be described.

Figure 9:
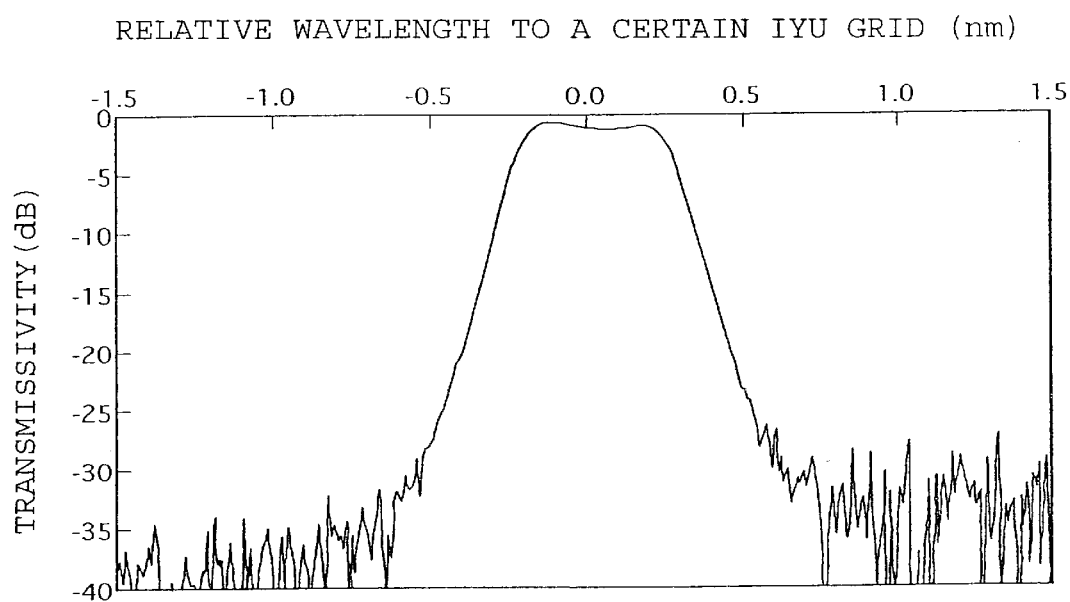
FIG. 9 is a graph showing a characteristic of a bandpass filter (BPF) applicable to the present invention.

The optical filter 53 couples the WDM port 51 to the port 52(#8) by the wavelength λ8, and also couples the WDM port 51 to the optical filter 54 by the wavelengths λ1 to λ7 and λ9 to λ16. The optical filter 53 may be provided by a bandpass filter (BPF) having a passband including the wavelength λ8 and excluding the wavelengths λ1 to λ7 and λ9 to λ16. This BPF has a dielectric multilayer film of 4 cavities and 180 layers, for example, and has a characteristic shown in FIG. 9. In FIG. 9, the vertical axis represents transmissivity (dB) and the horizontal axis represents relative wavelength (nm) to a certain ITU grid.

The optical filter 54 couples the optical filter 53 to the optical filter 55 by the wavelengths λ1 to λ7, and also couples the optical filter 53 to the optical filter 56 by the wavelengths λ9 to λ16. The optical filter 54 may be provided by a long-wave pass filter (LWPF) (or a short-wave pass filter (SWPF)). Since the coupling in the optical filter 53 is not related with the wavelength λ8, the LWPF or SWPF as the optical filter 54 may have a cutoff wavelength substantially equal to the wavelength λ8.

The optical filter 55 couples the optical filter 54 to the ports 52(#1) to 52(#7) respectively by the wavelengths λ1 to λ7. The optical filter 56 couples the optical filter 54 to the ports 52(#9) to 52(#16) respectively by the wavelengths λ9 to λ16. While each of the optical filters 55 and 56 may be configured by applying the prior art shown in FIG. 2, for example, the present invention is not limited by this configuration. Further, while each of the optical filters 55 and 56 is preferably configured by combining BPFs each having a dielectric multilayer film, it may be provided by any one kind of filters selected from BPFs, LWPFs, and SWPFs, or by the combination of these kinds of filters. Further, each of the optical filters 55 and 56 may be provided by an AWG.

A minimum value of the insertion loss of the optical device shown in FIG. 5 is given by the loss between the WDM port 51 and the port 52(#8), and this minimum value is Lt in the case that the optical filter 53 is provided by a BPF. A maximum value of the insertion loss is given by the loss between the WDM port 51 and the port 52(#16), and this maximum value is L1+Lt+8 Lr. Accordingly, a maximum variation in insertion loss between the wavelengths in this optical device becomes L1+8 Lr as a difference between the maximum loss and the minimum loss. Thus, the maximum variation in this optical device can be made smaller than that in the optical device shown in FIG. 2. Further, as compared with the optical filter 43 shown in FIG. 3, the optical filter 54 shown in FIG. 5 is not required to have so severe characteristic, so that the optical device shown in FIG. 5 can be easily manufactured. This will now be described more specifically.

Figure 6:
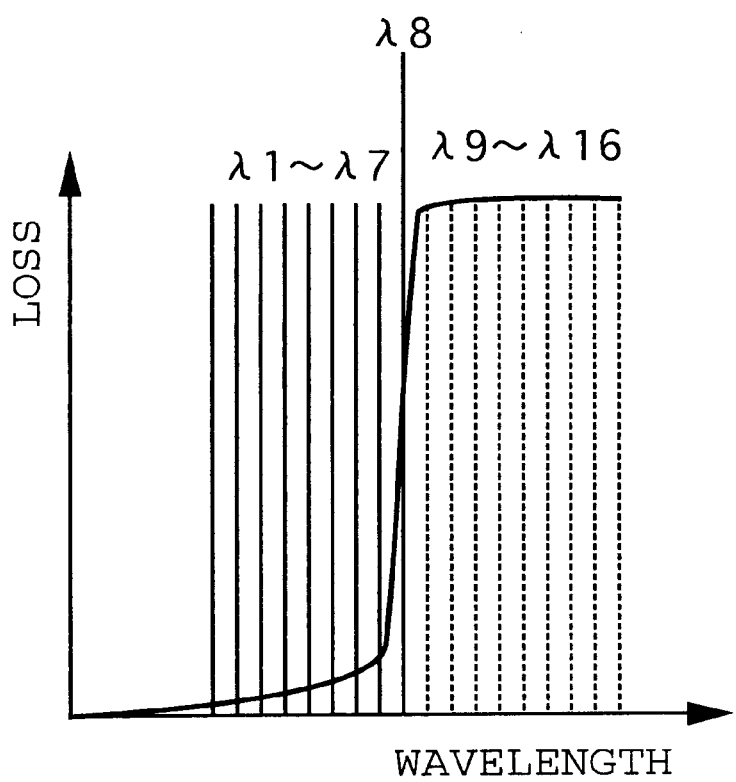
FIG. 6 is a graph showing a characteristic of a long-wave pass filter (LWPF) shown in FIG. 5.

FIG. 6 shows a characteristic of the LWPF as the optical filter 54 shown in FIG. 5. FIG. 6 is similar in view to FIG. 4. In the preferred embodiment shown in FIG. 5, the cutoff wavelength of the LWPF as the optical filter 54 can be set substantially equal to the wavelength λi as mentioned above. Accordingly, the range of presence of a loss tilt portion near the cutoff wavelength can be expanded to a spacing of two wavelengths (e.g., 1.6 nm) (in the characteristic shown in FIG. 4, this range is a spacing of one wavelength (e.g., 0.8 nm)). Accordingly, the loss tilt can be reduced (made less steep). As a result, the optical filter 54 can be provided without the need for a highly skilled technique, and the optical device can therefore be easily manufactured. For example, an LWPF having such a characteristic that the loss rises within a wavelength spacing of 1.6 nm can be realized by a dielectric multilayer film having 2 cavities and about 40 layers, thereby facilitating the design of the optical parameters and the alignment of the optical axis.

Figure 7:
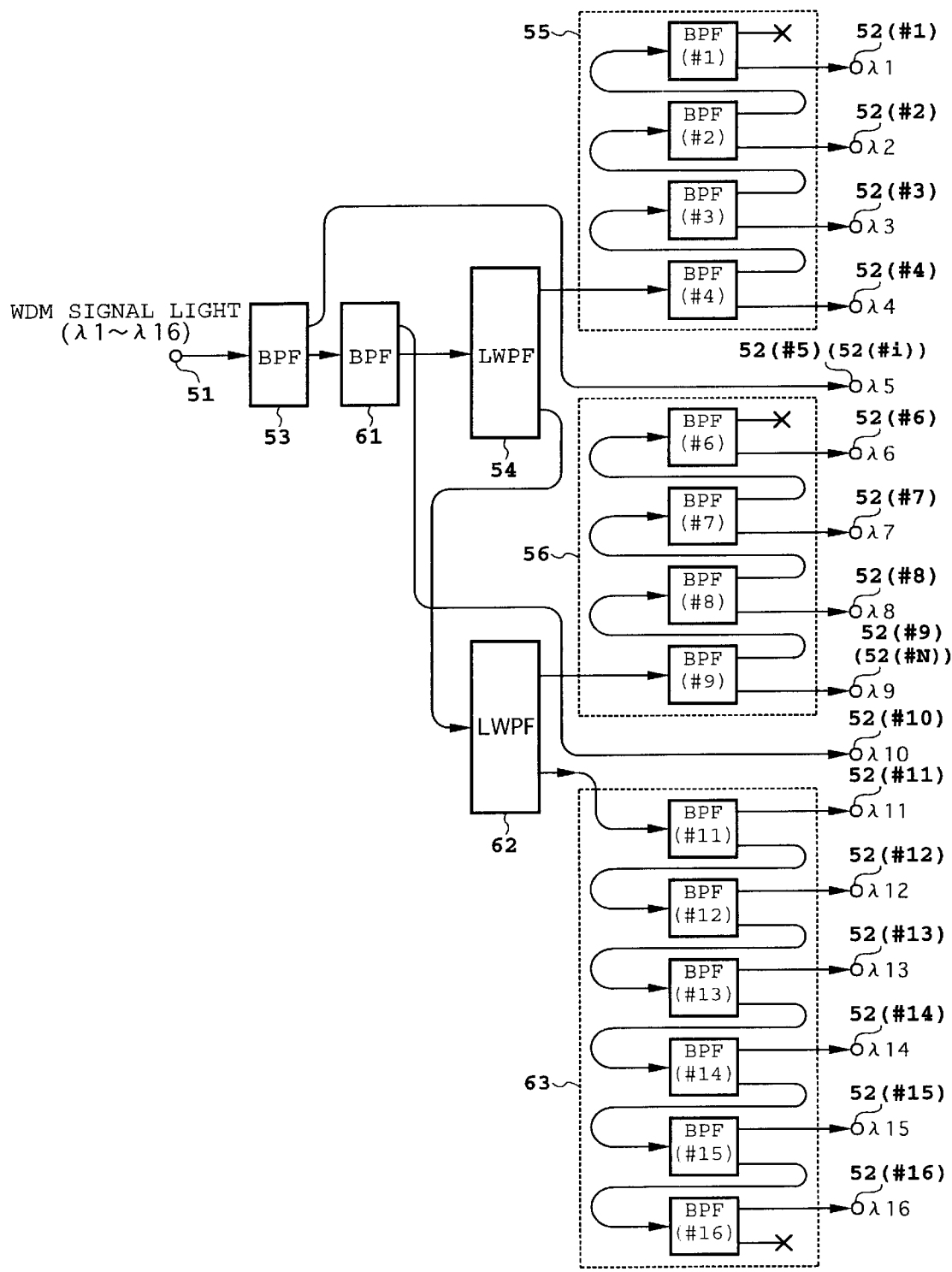
FIG. 7 is a block diagram showing a second preferred embodiment of the optical device according to the present invention.

FIG. 7 is a block diagram showing a second preferred embodiment of the optical device according to the present invention. In contrast to the optical device shown in FIG. 5, the second preferred embodiment shown in FIG. 7 additionally employs optical filters 61, 62, and 63. Further, in the preferred embodiment shown in FIG. 5, the operation of each filter has been described on the assumption that N=16 and i=8. In contrast thereto, it is assumed that N=9 and i=5 in the preferred embodiment shown in FIG. 7. While the following description may partially overlap the description of the preferred embodiment shown in FIG. 5, the operation of the optical device shown in FIG. 7 will now be described more generally with the values of N and i not being limited.

This optical device includes a WDM port 51 adapted to WDM, a plurality of ports 52(#1) to 52(#N) to which different wavelengths λ1 to λN are respectively allocated (N is an integer greater than 4), and a plurality of optical filters 53, 54, 55, and 56. In contrast to the preferred embodiment shown in FIG. 5, the preferred embodiment shown in FIG.

7 is characterized in that the optical device further includes a plurality of ports 52(#(N+1)) to 52(#(N+j)) to which different wavelengths λ(N+1) to λ(N+j) are respectively allocated (j is an integer greater than 2), and a plurality of optical filters 61, 62, and 63.

The optical filter 53 couples the WDM port 51 to the port 52(#i) by the wavelength λi (i is an integer satisfying 3≦i≦(N−2)), and also couples the WDM port 51 to the optical filter 54 (through the optical filter 61) by the plural wavelengths except the wavelength λi.

The optical filter 54 couples the optical filter 53 to the optical filter 55 (through the optical filter 61) by the wavelengths λ1 to λ(i−1), and also couples the optical filter 53 to the optical filter 56 (through the optical filter 61) by the wavelengths λ(i+1) to λN.

The optical filter 55 couples the optical filter 54 to the ports 52(#1) to 52(#(i−1)) respectively by the wavelengths λ1 to λ(i−1).

The optical filter 56 couples the optical filter 54 to the ports 52(#(i+1)) to 52(#N) (through the optical filter 62) respectively by the wavelengths λ(i+1) to λN.

The optical filter 61 couples the optical filter 53 to the port 52(#(N+1)) by the wavelength λ(N+1), and also couples the optical filter 53 to the optical filter 54 by the plural wavelengths except the wavelength λ(N+1).

The optical filter 62 couples the optical filter 54 to the optical filter 56 by the wavelengths λ(i+1) to λN, and also couples the optical filter 54 to the optical filter 63 by the wavelengths λ(N+2) to λ(N+j).

The optical filter 63 couples the optical filter 62 to the ports 52(#(N+2)) to 52(#(N+j)) respectively by the wavelengths λ(N+2) to λ(N+j).

The optical filter 62 may be provided by an LWPF, for example, like the optical filter 54. The optical filter 63 may include a plurality of cascaded BPFs, for example, like the optical filters 55 and 56.

Also according to the preferred embodiment shown in FIG. 7, it is possible to provide an optical device which can be easily manufactured and can reduce a maximum variation in insertion loss between the wavelengths as in the preferred embodiment shown in FIG. 5.

Figure 8:
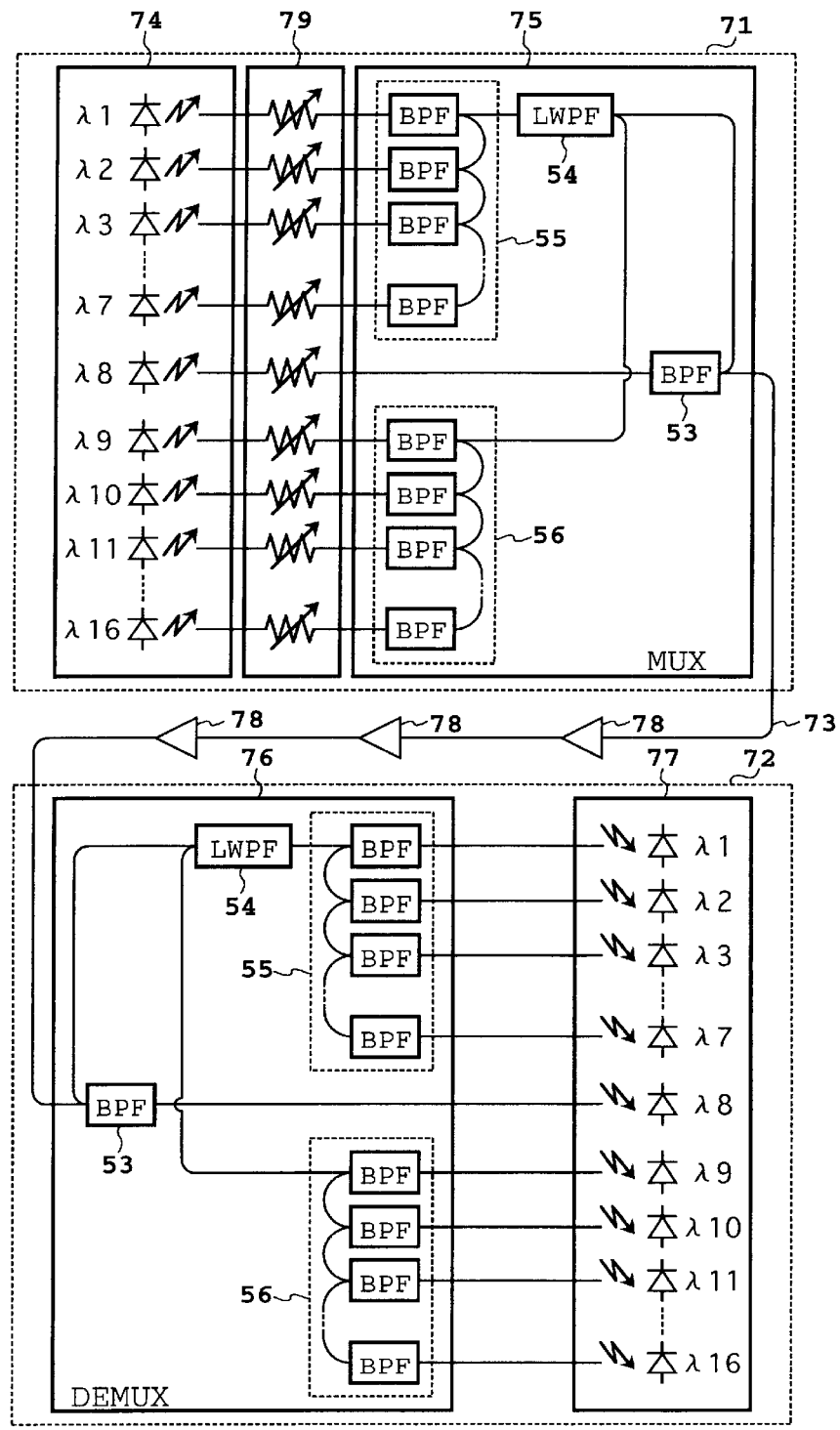
FIG. 8 is a block diagram showing a preferred embodiment of the system according to the present invention.

FIG. 8 is a block diagram showing a preferred embodiment of the system according to the present invention. This system includes a terminal apparatus 71 as a transmitting end, a terminal apparatus 72 as a receiving end, and an optical fiber transmission line 73 connecting the terminal apparatuses 71 and 72. The terminal apparatus 71 includes a transmitting unit 74 including a plurality of optical transmitters for outputting a plurality of optical signals having different wavelengths λ1 to λ16, and an optical multiplexer (MUX) 75 for wavelength division multiplexing these optical signals and outputting resultant WDM signal light to the optical fiber transmission line 73. The terminal apparatus 72 includes an optical demultiplexer (DEMUX) 76 for separating WDM signal light transmitted by the optical fiber transmission line 73 into a plurality of optical signals having wavelengths λ1 to λ16, and a receiving unit 77 including a plurality of optical receivers for receiving the optical signals having the wavelengths λ1 to λ16 output from the optical demultiplexer 76.

To increase a transmission distance, a plurality of optical amplifiers 78 are arranged along the optical fiber transmission line 73. Each optical amplifier 78 is an EDFA (erbium doped fiber amplifier), for example. Alternatively, a single optical amplifier 78 may be provided instead.

The optical device according to the present invention may be used as each of the optical multiplexer 75 and the optical demultiplexer 76. In this preferred embodiment, each of the optical multiplexer 75 and the optical demultiplexer 76 includes the optical device shown in FIG. 5. Alternatively, one of the optical multiplexer 75 and the optical demultiplexer 76 may include the optical device according to the present invention.

In the case that the optical amplifiers 78 are arranged along the optical fiber transmission line 73, it is effective in improving a transmission quality to sufficiently reduce an interchannel power deviation in the WDM signal light to be output from the optical multiplexer 75 to the optical fiber transmission line 73. To this end, the terminal apparatus 71 further includes an attenuation module 79 in this preferred embodiment. The attenuation module 79 includes a plurality of variable optical attenuators for adjusting or controlling the powers of the optical signals having the wavelengths λ1 to λ16 to be supplied from the transmitting unit 74 to the optical multiplexer 75. The attenuation module 79 is preliminarily adjusted or feedback controlled so as to eliminate the interchannel power deviation in the WDM signal light to be output from the optical multiplexer 75 to the optical fiber transmission line 73. A loop for such feedback control may include a spectrum analyzer for monitoring the spectrum of the WDM signal light output from the optical multiplexer 75, for example. To compensate for a wavelength characteristic of gain which may exist in each optical amplifier 78, preemphasis may be performed by adjusting the attenuation module 79 so that the powers of the optical signals in the WDM signal light are weighted.

According to this preferred embodiment, the terminal apparatus 71 as a transmitting end has the optical multiplexer 75 whose maximum variation in insertion loss between the wavelengths is reduced by the application of the present invention. Accordingly, a transmission quality can be improved to the maximum irrespective of limited characteristics of the transmitting unit 74 and the optical amplifiers 78. In the case of using an optical multiplexer to which the prior art is applied, it is necessary to largely attenuate the power of an optical signal in a wavelength channel giving the largest value of insertion loss and to also largely attenuate the powers of optical signals in the other wavelength channels in accordance with the wavelength channel giving the largest value of insertion loss, so as to reduce the interchannel power deviation in WDM signal light to be output from the optical multiplexer. As a result, a transmission quality in this case is degraded under the limited characteristics of the transmitting unit 74 and the optical amplifiers 78.

Further, the terminal apparatus 72 as a receiving end has the optical demultiplexer 76 whose maximum variation in insertion loss between the wavelengths is reduced by the application of the present invention. Accordingly, a high transmission quality can be obtained irrespective of the limited characteristics of the receiving unit 77.

While the optical device according to each preferred embodiment mentioned above is configured by the combination of bandpass filters and long-wave pass filters, a part or the whole of such a combination may be replaced by an optical power coupler, polarized beam splitter, or optical filter having a periodic wavelength characteristic in embodying the present invention.

According to the present invention as described above, it is possible to provide an optical device usable as an optical multiplexer and/or an optical demultiplexer which can be easily manufactured and can reduce a maximum variation in insertion loss between wavelengths. Accordingly, a transmission quality can be improved by using this optical device to configure a terminal apparatus as a transmitting end or a receiving end. Thus, the present invention can greatly contribute to the improvement in transmission quality in an optical fiber transmission system adopting wavelength division multiplexing.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:

a WDM port adapted to wavelength division multiplexing (WDM);

first to N-th ports to which first to N-th wavelengths are respectively allocated, where N is an integer greater than 4; and first to fourth optical filters;

said first optical filter coupling said WDM port to said i-th port by said i-th wavelength, where i is an integer satisfying $3 \leq i \leq (N-2)$, and also coupling said WDM port to said second optical filter by the plural wavelengths except said i-th wavelength;

said second optical filter coupling said first optical filter to said third optical filter by said first to (i−1)-th wavelengths, and also coupling said first optical filter to said fourth optical filter by said (i+1)-th to N-th wavelengths;

said third optical filter coupling said second optical filter to said first to (i−1)-th ports respectively by said first to (i−1)-th wavelengths;

said fourth optical filter coupling said second optical filter to said (i+1)-th to N-th ports respectively by said (i+1)-th to N-th wavelengths.

2. An optical device according to claim 1, wherein said first optical filter comprises a bandpass filter having a passband including said i-th wavelength.

3. An optical device according to claim 1, wherein said second optical filter comprises any one of a long-wave pass filter and a short-wave pass filter.

4. An optical device according to claim 3, wherein said second optical filter has a cutoff wavelength substantially equal to said i-th wavelength.

5. An optical device according to claim 1, wherein:

said third optical filter comprises a plurality of bandpass filters respectively connected to said first to (i−1)-th ports; and said fourth optical filter comprises a plurality of bandpass filters respectively connected to said (i+1)-th to N-th ports.

6. An optical device according to claim 1, wherein at least one of said first to fourth optical filters comprises a dielectric multilayer film.

7. An optical device according to claim 1, wherein at least one of said first to fourth optical filters comprises an optical circulator having at least three ports, and a fiber grating connected to one of said at least three ports.

8. An optical device according to claim 1, further comprising:

(N+1)-th to (N+j)-th ports to which (N+1)-th to (N+j)-th wavelengths are respectively allocated, where j is an integer greater than 2; and fifth to seventh optical filters;

said fifth optical filter coupling said first optical filter to said (N+1)-th port by said (N+1)-th wavelength, and also coupling said first optical filter to said second optical filter by the plural wavelengths except said (N+1)-th wavelength;

said sixth optical filter coupling said second optical filter to said fourth optical filter by said (i+1)-th to N-th wavelengths, and also coupling said second optical filter to said seventh optical filter by said (N+2)-th to (N+j)-th wavelengths;

said seventh optical filter coupling said sixth optical filter to said (N+2)-th to (N+j)-th ports respectively by said (N+2)-th to (N+j)-th wavelengths.

* * * * *